US010418932B2

(12) United States Patent
Carabateas (10) Patent No.: US 10,418,932 B2
(45) Date of Patent: Sep. 17, 2019

(54) MIRROR SYSTEM FOR CONSIDERABLY INCREASING THE PRODUCTIVITY OF PHOTOVOLTAIC POWER PLANTS

(71) Applicant: Eustratios N. Carabateas, Kiffisa (GR)

(72) Inventor: Eustratios N. Carabateas, Kiffisa (GR)

( * ) Notice: Subject to any disclaimer, the term of this patent is extended or adjusted under 35 U.S.C. 154(b) by 1115 days.

(21) Appl. No.: 14/326,911

(22) Filed: Jul. 9, 2014

(65) Prior Publication Data
US 2016/0013752 A1    Jan. 14, 2016

(51) Int. Cl.
*H02S 40/22* (2014.01)
*H02S 20/10* (2014.01)

(52) U.S. Cl.
CPC ............ *H02S 40/22* (2014.12); *H02S 20/10* (2014.12); *Y02E 10/52* (2013.01)

(58) Field of Classification Search
CPC ......... Y02E 10/52; H02S 40/22; H02S 20/10; H02S 20/30; H02S 20/00–32; F24S 23/70–79; F24S 2023/87
See application file for complete search history.

(56) References Cited

U.S. PATENT DOCUMENTS

| | | | |
|---|---|---|---|
| 3,466,119 A * | 9/1969 | Giovanni | F24S 30/455 359/851 |
| 3,780,722 A | 12/1973 | Swet | |
| 4,106,952 A | 8/1978 | Kravitz | |
| 4,388,481 A | 6/1983 | Uroshevich | |
| 4,710,588 A | 12/1987 | Ellion | |
| 5,167,724 A | 12/1992 | Chiang | |
| 5,288,337 A | 2/1994 | Mitchell | |
| 5,374,317 A * | 12/1994 | Lamb | F24J 2/10 126/685 |
| 5,578,140 A | 11/1996 | Yogev | |
| 5,659,423 A | 8/1997 | Schierbeek | |
| 6,276,359 B1 | 8/2001 | Frazier | |
| 7,301,095 B2 | 11/2007 | Murphy | |
| 7,381,886 B1 | 6/2008 | Aiken | |
| 7,851,693 B2 | 12/2010 | Fork | |
| 8,188,415 B2 | 5/2012 | Kats | |
| 8,283,555 B2 | 10/2012 | Kokotov | |

(Continued)

FOREIGN PATENT DOCUMENTS

| | | | | |
|---|---|---|---|---|
| WO | WO 2012090191 A1 * | 7/2012 | ............... | F24J 1/00 |
| WO | WO 2014082653 A1 * | 6/2014 | ............... | F24J 2/541 |

*Primary Examiner* — Liesl C Baumann
(74) *Attorney, Agent, or Firm* — Michael N. Cohen; Cohen I.P. Law Group, P.C.

(57) ABSTRACT

A method and system for generating electrical energy, comprises a plurality of photovoltaic panels positioned in a core area, a plurality of ground mirrors positioned in a plurality of land areas and a plurality of reverse mirror systems held at each of the plurality of reflection centers for increasing the amount of solar energy falling on the core area. Each of the plurality of reverse mirror systems further comprises a high rising cylindrical pole having a hollow horizontal support and a vertical support, a plurality of adjustable supports and a reverse mirror placed in a mirror support frame and rigidly or hingedly connected to the vertical support. The plurality of ground mirrors and the plurality of reverse mirror systems are positioned to maximize the concentration of solar energy falling on the plurality of photovoltaic panels and thereby to increase the amount of electric energy produced.

18 Claims, 6 Drawing Sheets

(56) References Cited

U.S. PATENT DOCUMENTS

| | | |
|---|---|---|
| 8,338,693 B2 | 12/2012 | Raymond |
| 8,408,198 B2 | 4/2013 | Bender |
| 8,430,093 B1 | 4/2013 | Harris |
| 8,455,755 B2 | 6/2013 | Correia |
| 8,474,445 B2 * | 7/2013 | Fairstein .................. F24S 23/74 126/600 |
| 8,528,277 B2 | 9/2013 | Schwarze |
| 8,541,679 B2 | 9/2013 | Wang |
| 8,546,681 B2 | 10/2013 | Wares |
| 8,546,686 B2 | 10/2013 | Ashkin |
| 2008/0308154 A1 | 12/2008 | Cart |
| 2009/0229264 A1 * | 9/2009 | Gilon ..................... F03G 6/001 60/641.8 |
| 2009/0314326 A1 | 12/2009 | Saha |
| 2009/0320830 A1 | 12/2009 | Bennett |
| 2010/0139644 A1 * | 6/2010 | Schwarzbach ............. F24J 2/07 126/573 |
| 2010/0269891 A1 * | 10/2010 | Kinard .............. H01L 31/02008 136/251 |
| 2010/0300510 A1 | 12/2010 | Goldman |
| 2012/0090665 A1 * | 4/2012 | Zuritis ................... F24J 2/5232 136/251 |
| 2012/0192917 A1 * | 8/2012 | Whitted ..................... F24J 2/38 136/246 |
| 2012/0314314 A1 * | 12/2012 | Wang ........................ F24J 2/38 359/853 |
| 2013/0152914 A1 | 6/2013 | Martinez-Val Penalosa et al. |
| 2013/0220303 A1 | 8/2013 | Schramek |
| 2013/0298990 A1 | 11/2013 | Caparros Jimenez |
| 2013/0305518 A1 * | 11/2013 | Adriani ................. F24J 2/5245 29/592.1 |
| 2014/0008312 A1 * | 1/2014 | Durney .................... F24S 25/65 211/26 |
| 2014/0020731 A1 * | 1/2014 | Levi ........................ F24J 1/00 136/245 |
| 2015/0316639 A1 * | 11/2015 | Russ ........................ F24J 2/541 250/203.4 |

* cited by examiner

MIRROR SYSTEM FOR CONSIDERABLY INCREASING THE PRODUCTIVITY OF PHOTOVOLTAIC POWER PLANTS

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

The present disclosure relates generally to photovoltaic systems for producing electricity and more particularly to a system that utilize photovoltaic cells and mirrors to increase the amount of electric energy produced.

DISCUSSION OF RELATED ART

Photovoltaic plants consist of panels made of photovoltaic cells which convert the solar radiation impinging on them to electricity. Photovoltaic cells are expensive items as they are produced through elaborate processes of making crystalline silicon, cutting it to very thin wafers, doping it with very special substances in high temperature ovens, making contacts for electricity transfer etc., or by depositing a thin layer of amorphous silicon together with other special substances on a substrate such as glass or metal. Photovoltaic technology uses optics such as lenses to concentrate a large amount of sunlight onto a small area of solar photovoltaic cells to generate electricity. The lenses are normally very costly. To reduce the high cost of photovoltaic systems, a mirror system can be used to reflect solar energy and concentrate it onto the photovoltaic cells. Conventional mirror systems include parabolic mirrors, curved mirrors and reflectors to reflect the solar radiation. However, these curved mirrors require very high surface accuracies and are therefore costly and increase maintenance cost so that the efficient production of electricity by using them has inherent limitations.

One existing photovoltaic system comprises a solar energy plant in which incoming solar radiation is concentrated by a Fresnel reflector, i.e. a field of concentrating mirrors, and the concentrated radiation is focused into a solar receiver. In one embodiment, a dielectric mirror is provided at a suitable level above the solar collector, to reflect the concentrated solar radiation into the collector. Such a system concentrates solar radiation from a certain area to one point, the receiver, as widely practiced in solar tower thermal power systems. In this system, the receiver where all the energy conversion equipment is located is placed near the ground rather than at the top of a very high rise tower. However, the solar radiation falling in each point of a certain area is not reflected to a respective point in another area. Moreover, the solar radiation falling on a particular land area is concentrated to a given point so that such a system cannot bring radiation from many different areas to a given sizable area thereby reducing the output possibilities of the system.

In a known prior art related to a conventional Cassegrain-type concentrating solar collector the system includes primary and secondary mirrors disposed on opposing convex and concave surfaces of a light-transparent (e.g., glass) optical element. Light enters an aperture surface surrounding the secondary mirror, and is reflected by the primary mirror toward the secondary mirror, which re-reflects the light onto a photovoltaic cell. The photovoltaic cell is mounted on a central portion of heat spreader that extends over the primary mirror. The heat spreader transmits waste heat from the photovoltaic cell in a manner that evenly distributes the heat over the optical element, thereby maximizing the radiation of heat from the aperture surface into space. However, such a solar collector does not include any reverse mirror system to direct the sun rays received from different angles from a certain land area to different photovoltaic panels in another area thus increasing their electricity production.

Another existing photovoltaic device comprises an array of elongate reflector elements mounted substantially parallel to one another and transversely spaced in series, at least one of the reflector elements having an elongate concave surface to reflect incident solar radiation towards a forward adjacent reflector element in the array. The reflector element includes a photovoltaic receptor mounted on the reflector element by a mounting arrangement to receive reflected solar radiation from a rearward adjacent reflector element. However, the photovoltaic device does not include a special configuration in which the ground area surrounding a photovoltaic plant is covered with mirrors in such a way that the sunlight falling on those mirrors is directed to fall on the photovoltaic cells of the plant using an elevated reverse mirror system.

Therefore, there is a need for an economical and improved photovoltaic system of a special configuration in which the ground area surrounding a photovoltaic plant is covered with mirrors in such a way that the sunlight falling on those mirrors is directed to fall on the photovoltaic cells. Such a needed system would include a plurality of ground mirrors to direct solar radiation from different angles to an elevated reverse mirror. Such reverse mirror subsequently directs the solar radiation received from different angles to the photovoltaic panels. Such a system would track both direct solar radiation and the reflected solar radiation from the plurality of mirrors. Finally, a preferred embodiment of such a system would provide increased electricity production by a factor of about six in magnitude. The present invention accomplishes these objectives.

SUMMARY OF THE DISCLOSURE

The present embodiment is a photovoltaic system utilizing a plurality of mirrors for increasing the concentration of solar radiation falling on an area covered with photovoltaic panels and thereby to increase the production of electricity. The present invention discusses in detail the arrangement of a plurality of solar photovoltaic panels and the plurality of mirrors in a photovoltaic plant to achieve an increased production of electrical energy.

The present embodiment is a method and system for generating electrical energy comprising a plurality of photovoltaic panels positioned in a core area, a plurality of ground mirrors positioned in a plurality of land areas and a plurality of reverse mirror systems positioned on the plurality of land areas. The plurality of ground mirrors positioned on the plurality of land areas reflect the solar radiation to the core area thereby increasing the concentration of solar radiation falling on the plurality of photovoltaic panels. A plurality of reflection centers are formed on the plurality of land areas such that each point on the plurality of land areas is reflected to a corresponding reflected point on the core area. Each of the plurality of reverse mirror systems are positioned at each of the plurality of reflection centers for increasing the amount of solar energy falling on the core area. Each of the reverse mirror system further comprises a high rise cylindrical pole, a plurality of supports, a reverse mirror placed in a mirror support frame which may be cooled and a plurality of adjustable supports. The cylindrical pole has a top end and a hinged base attached to the ground at the reflection center on the land area. The plurality of supports include a hollow horizontal support having a proximal end and a distal end and a vertical support having a first end and a second end. The proximal end of the hollow horizontal support is attached near the top end of the cylindrical pole by means of a hinge. The reverse mirror is placed in the mirror support frame and rigidly or hingedly connected to the second end of the vertical support. The reverse mirror may be provided with water, air or passive cooling or a combination of these.

The mirror support frame includes a plurality of rim supports, a plurality of middle supports and a plurality of tightening means to hold the reverse mirror firmly to the mirror support frame. Furthermore the mirror support frame is held in position by a plurality of adjustable supports. These include a First adjustable support connected between the mirror support frame and the distal end of the hollow horizontal support, and a second adjustable support hingedly connected between the cylindrical pole and a point near the distal end of the hollow horizontal support. Each of the plurality of adjustable supports includes a threaded cylindrical rod slidably attached to a rectangular section and held in position by means of a pair of fastening means. The fastening means are attached to a gear which can be moved by a motor.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The following describes a photovoltaic system utilizing a plurality of mirrors for increasing the concentration of solar radiation falling on a plurality of photovoltaic panels and thereby to increase the production of electricity. The present invention discusses in detail the arrangement of the plurality of photovoltaic panels and the plurality of mirrors in a photovoltaic plant to achieve an increased production of electrical energy. This invention, however, may be embodied in many different ways, and the description provided herein should not be construed as limiting in any way. The present embodiment discloses a special configuration in which the plurality of mirrors is placed on a plurality of land areas surrounding the plurality of photovoltaic panels in such a way that the sunlight falling on the plurality of mirrors is directed to fall on the plurality of photovoltaic panels so that the electricity production of the plant is increased considerably. The following detailed descriptions should not be taken in a limiting sense.

Figure 1:
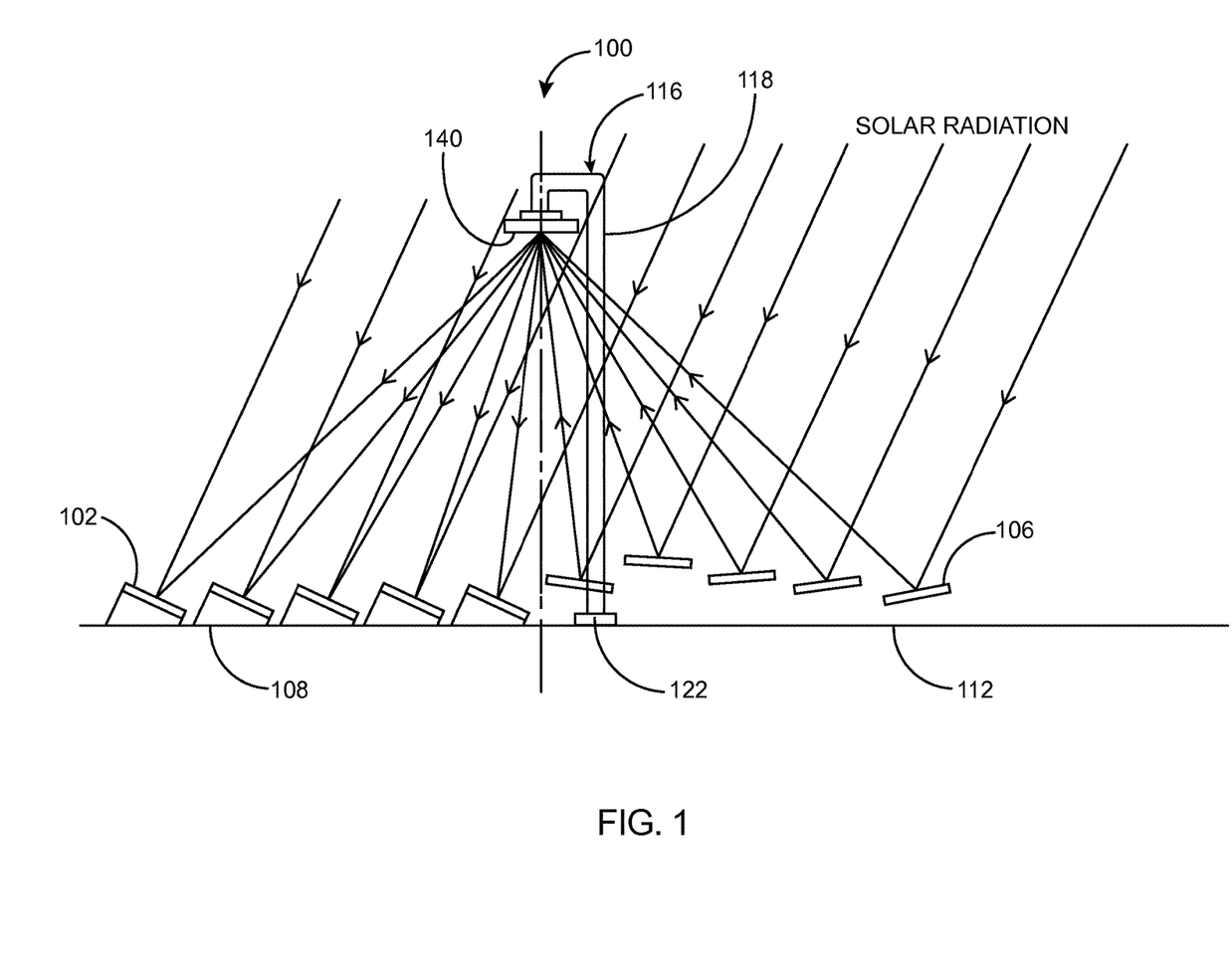
FIG. 1 illustrates a schematic perspective view of a photovoltaic system according to a preferred embodiment of the present invention.
Figure 2:
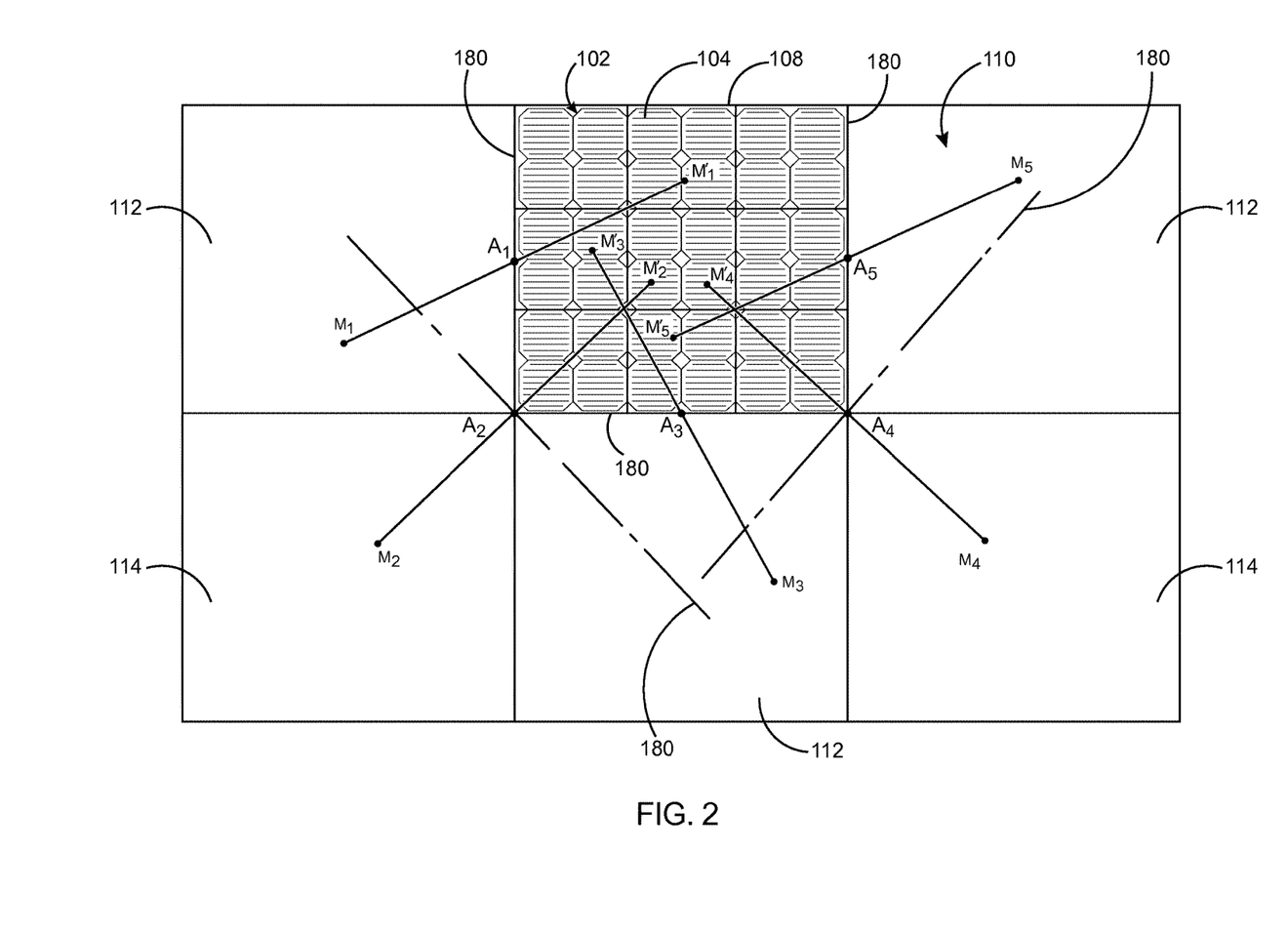
FIG. 2 illustrates an isometric view of a plurality of ground mirrors areas, a plurality of photovoltaic cells in a core area and a plurality of reverse mirrors reflection centers $A_1$, $A_2$, $A_3$, $A_4$, $A_5$ arranged according to the preferred embodiment of the present invention showing the one to one correspondence between each point in each of the ground mirror areas and a respective reflection point, with respect to the respective reverse mirror, in the photovoltaic panels core area.

FIG. 1 illustrates a schematic perspective view of a photovoltaic system 100 according to a preferred embodiment of the present invention. The photovoltaic system 100 for generating electrical energy comprises a plurality of photovoltaic panels 102 positioned in a core area 108, a plurality of ground mirrors 106 positioned in a plurality of land areas 110 and a plurality of reverse mirror systems 116 positioned on the plurality of land areas 110. Each of the plurality of photovoltaic panels 102 includes a plurality of photovoltaic cells 104 that convert solar energy to electrical energy. The plurality of photovoltaic panels 102 are placed south facing in the northern hemisphere or north facing in the southern hemisphere at an angle with the horizontal to achieve best yearly average incidence of solar radiation, or they may be adjustable with respect to that angle. The plurality of ground mirrors 106 positioned on the plurality of land areas 110 reflect the solar radiation to the core area 108 and increases the concentration of solar radiation falling on the plurality of photovoltaic panels 102. The plurality of ground mirrors 106 is placed at different heights from the ground to allow for certain overlapping, in order to obtain best collection for the different angles of the solar radiation. As the concentration of solar radiation falling on the plurality of photovoltaic panels 102 is increased the production of electricity is also increased. The core area 108 and the plurality of land areas 110 are usually of square or rectangular shape and of same size. The plurality of land areas 110 includes a plurality of side adjacent areas 112 and a plurality of diagonally adjacent areas 114 as illustrated in FIG. 2. The plurality of side adjacent areas 112 is located at the sides of the core area 108, towards south in the northern and north in the southern hemisphere, and the plurality of diagonally adjacent areas 114 is located along the projections of the two diagonals of the core area 108 as illustrated in FIG. 2. A plurality of reflection centers $A_1$, $A_2$, $A_3$, $A_4$ and $A_5$ is formed on the plurality of land areas 110 and the periphery of the core area 108 such that each point on the plurality of land areas 110 is reflected to a corresponding reflected point on the core area 108. For example, the points $M_1$, $M_2$, $M_3$, $M_4$ and $M_5$ on the plurality of land areas 110 have corresponding reflected points $M'_1$, $M'_2$, $M'_3$, $M'_4$ and $M'_5$, through the plurality of reflection centers $A_1$, $A_2$, $A_3$, $A_4$ and $A_5$ respectively, on the core area 108 as shown in FIG. 2. In accordance with the concept of the invention, variations in the plurality of land areas 110 are possible in which the core area 108 may be surrounded by any number of land areas 110, each point of which can be considered to be reflected to a point of the same core area 108 in relation to appropriate reflection centers $A_1$, $A_2$, $A_3$, $A_4$ and $A_5$. Each of the plurality of reverse mirror systems 116 are positioned at each of the plurality of reflection centers $A_1$, $A_2$, $A_3$, $A_4$ and $A_5$ for increasing the amount of solar energy falling on the core area 108. The plurality of mirrors 106 and the plurality of reverse mirror systems 116 are positioned in such a way as to maximize the concentration of solar energy falling on the plurality of photovoltaic panels 102 and thereby increasing the amount of electric energy produced.

Figures 3A, 3B, 3C, 3D:
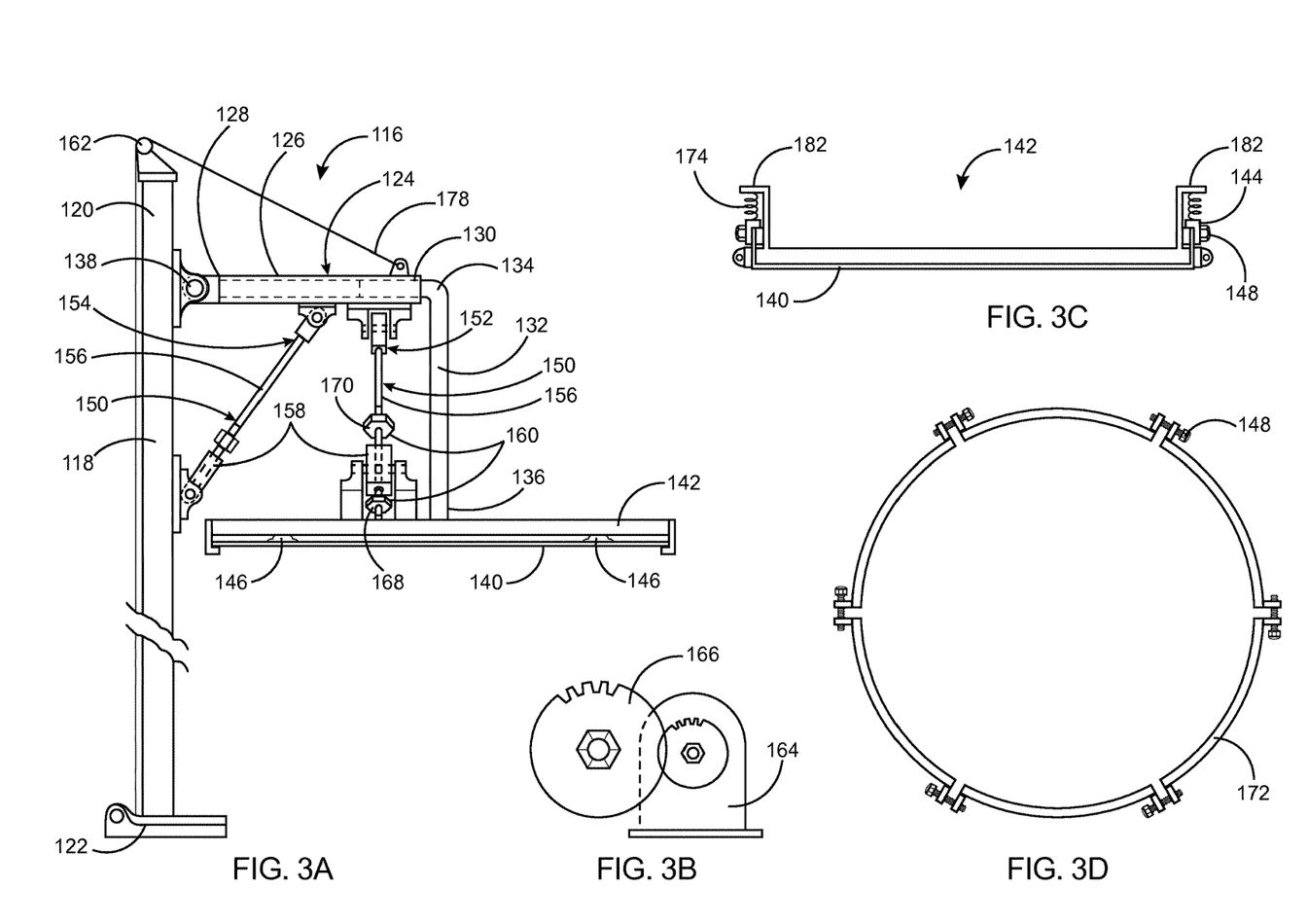
FIG. 3A illustrates a perspective view of a reverse mirror system according to a preferred embodiment of the present invention.
FIG. 3B illustrates an electric motor for adjusting the reverse mirror system according to the preferred embodiment of the present invention.
FIG. 3C illustrates a side perspective view of a mirror support frame according to the preferred embodiment of the present invention.
FIG. 3D illustrates a bottom isometric view of the reverse mirror positioned in the mirror support frame according to the preferred embodiment of the present invention.
Figure 4:
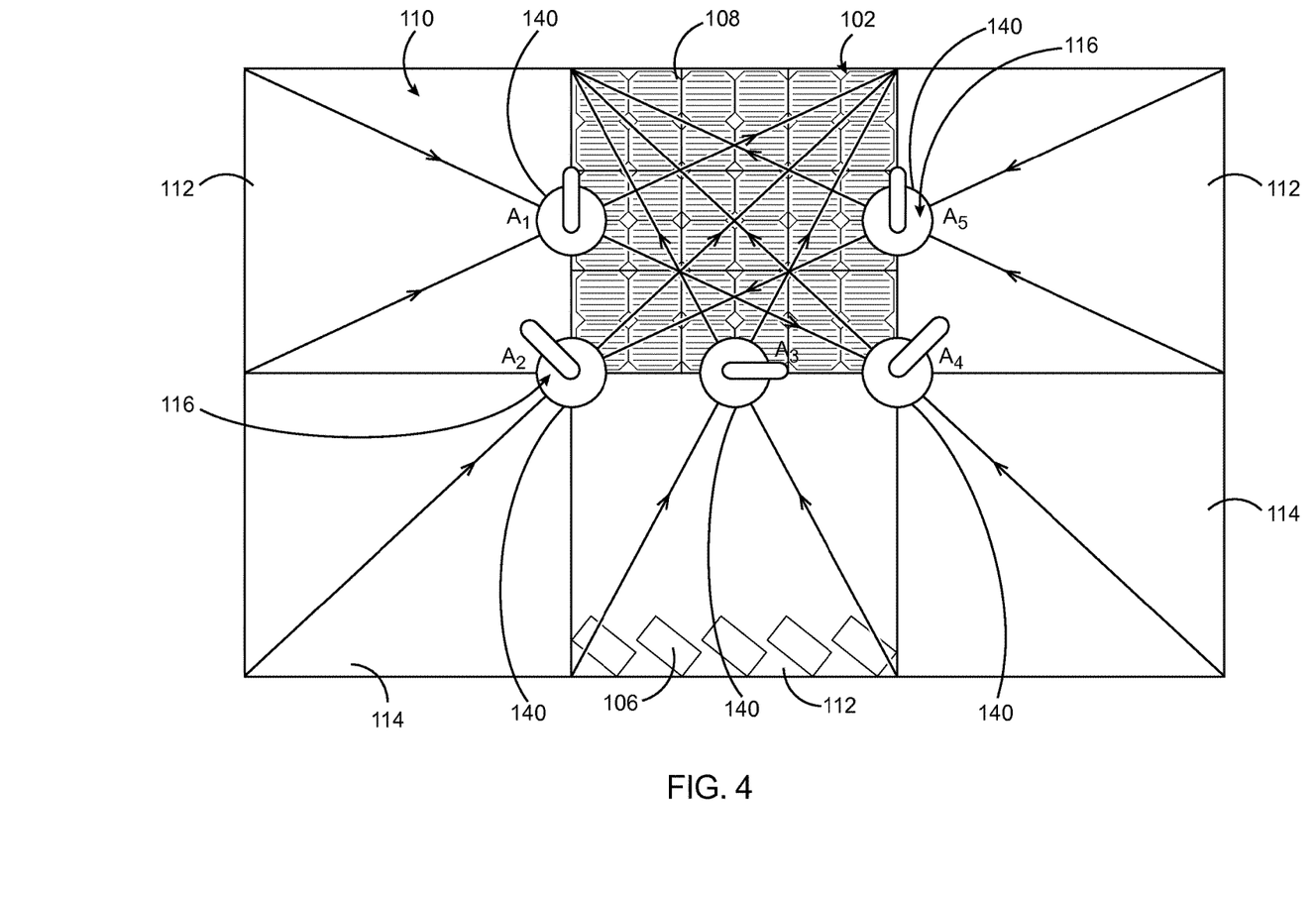
FIG. 4 illustrates an isometric view of the photovoltaic system according to a preferred embodiment of the present invention.

Referring to FIGS. 3A-3D, a perspective view of a reverse mirror system 116 according to a preferred embodiment of the present invention is illustrated in FIG. 3A. The reverse mirror system 116 further comprises a cylindrical pole 118, a plurality of supports 124, a reverse mirror 140 placed in a mirror support frame 142 and a plurality of adjustable supports 150. The cylindrical pole 118 has a top end 120 and a hinged base 122 attached to the ground at each of the plurality of reflection centers $A_1$, $A_2$, $A_3$, $A_4$ and $A_5$ on the plurality of land areas 110, the height of the cylindrical pole 118 being commensurate to the side dimension of the core area 108. The plurality of supports 124 includes a hollow horizontal support 126 having a proximal end 128 and a distal end 130 and a vertical support 132 having a first end 134 and a second end 136. The proximal end 128 of the hollow horizontal support 126 is attached near the top end 120 of the cylindrical pole 118 by means of a hinge 138. The first end 134 of the vertical support 132 is inserted into the distal end 130 of the hollow horizontal support 126. The reverse mirror 140 is placed in the mirror support frame 142 and rigidly or hingedly connected to the second end 136 of the vertical support 132. The reverse mirror 140 require proper adjustments so as to assure the refection of all the radiation coming to them from the plurality of ground mirrors 106 of its respective land area 110 to the plurality of photovoltaic panels 102 of the core area 108. The hollow horizontal support 126, through its hinged connection to the pole 118 allows upward and downward movement of the reverse mirror 140. This also changes its angle with respect to the horizontal plane by small rotations around an axis perpendicular to a reflection symmetry axis 180 of FIG. 2 for side adjacent areas 112 and around a diagonal for diagonally adjacent areas 114, as shown in FIG. 4. Such an upward and downward movement can be effected in many ways such as by a wire 178 attached at the distal end 120 of the horizontal support 126 and running through a pulley 162 at the top end 120 of the pole 118 and along the pole 118 all the way to the ground. The vertical support 132 being inserted, through a curb at its end into the hollow end of the horizontal support 126 allows the rotational movement of the reverse mirror 140 around the reflection symmetry axis 180 that is around the core area 108 side for the plurality of side adjacent areas 112, and around the perpendicular to the diagonal (also being reflection symmetry axis 180) (FIG. 2) for the plurality of diagonally adjacent areas 114. The mirror support frame 142 illustrated in FIG. 3C further includes a plurality of rim supports 144, a plurality of middle supports 146 and a plurality of tightening means 148 to hold the reverse mirror 140 firmly. The plurality or tightening means 148 are screws. The plurality of adjustable supports 150 is utilized for adjusting and positioning the reverse mirror 140. The plurality of adjustable supports 150 includes a first adjustable support 152 connected between the mirror support frame 142 and the distal end 130 of the hollow horizontal support 126, and a second adjustable support 154 hingedly connected between the cylindrical pole 118 and a point near the distal end 130 of the hollow horizontal support 126. Each of the plurality of adjustable supports 150 includes a threaded cylindrical rod 156 slidably attached to a rectangular section 158 and held in position by means of a pair of fastening means 160. The threaded cylindrical rod 156 contains threads over part of its sliding end which helps in adjusting, positioning and fastening of the reverse mirror 140. The pair of fastening means 160 includes a lower nut 168 and an upper nut 170 attached to a gear 166 which can be moved by a motor 164 as illustrated in FIG. 3B. By threading the lower nut 168 and unthreading the upper nut 170 the length of the first adjustable support 152 is shortened and the mirror support frame 142 moves sideways in one direction giving a rotation to the reverse mirror 140. A rotation in the opposite direction can be achieved by lengthening the first adjustable support 152 by threading the upper nut 170 and unthreading the lower nut 168. In a similar way the upward and downward movement of the reverse mirror 140 can be achieved by adjusting the length of the second adjustable support 154. The threading and unthreading of the pair of fastening means 160 can be achieved remotely and automatically by the motor 164.

In another embodiment of the reverse mirror and the mirror frame a continuous pole can be used with two 90° curbs, near its top, forming a fixed horizontal and a fixed vertical part at the end of which a flat platform is rigidly attached, of a size about equal to that of the mirror, to which the mirror is subsequently attached by middle flexible supports such as rubber hose or bellows and then wires are used to fix the mirror position, one end of these wires being attached to the rim of the mirror while the other passes through holes in the periphery of an horizontal flange at the top end of the vertical part, just after the second curb, and wound around a rotating cylindrical part fixed on the flange such that by rotating these cylindrical parts small changes to the wire lengths can be induced which using the flexibility of the middle supports result into small adjustments of the mirror position with respect to the horizontal. Other adjustment possibilities are also possible.

Each of the reverse mirrors 140 is positioned at each of the plurality of reflection centers $A_1$, $A_2$, $A_3$, $A_4$ and $A_5$ at the periphery of the core area 108 and is held at height by the thin cylindrical pole 118 to minimize shadow losses. As the plurality of ground mirrors 106 take different directions with respect to the fixed reverse mirror 140, the reverse mirror 140 is made of a circular shape with a diameter equal to the diagonal of the rectangular shaped ground mirrors 106, to assure that all the sun radiation falling and reflected from the plurality of ground mirrors 106 is directed and contained within the reflecting area of the reverse mirror 140. The plurality of ground mirrors 106 and the reverse mirror 140 has a very high reflection efficiency usually above 95%. However as the total solar radiation falling on each of the plurality of land areas 110 is directed and reflected by a single reverse mirror 140, a considerable amount of heat may have to be dissipated so that water, air or passive cooling or a combination of these may be required for the reverse mirror 140 surface. This can be accomplished by placing the reverse mirror 140 surface in good contact with a suitably cooled platform. The reverse mirror 140 can be produced of a single segment or from a number of segments. The reverse mirror 140 is held to the mirror frame 142 by the plurality of rim supports 144 and the plurality of middle supports 146 placed in many suitable positions of the mirror support frame 142. The plurality of middle supports 146 can be rubber hose supports or bellows which by compression of the hose loose the air inside the hose creating a vacuum which holds the weight of the reverse mirror 140 while the hoses remain compressed by the outside atmosphere to the surfaces they are attached thus maintaining their air tightness. The surface of the reverse mirror 140 can be made of metal covered glass or a polished thin metallic sheet. In the former case the flexibility of the rubber hoses or bellows can be utilized to provide adjustments to the mirror surface position. In the latter case the reverse mirror 140 is made by stretching the thin metallic sheet on the mirror support frame 142. The thin metallic sheet is bent and folded on to the sides of the mirror support frame 142, which may have cooling provisions and are connected to a plurality of springs 174 at the mirror periphery. The other end of the plurality of springs 174 is then tightened by means of a plurality of special inserts 182 in the mirror support frame 142 as illustrated in FIG. 3C. A plurality of circular lags 172 is inserted along the periphery of the mirror support frame 142 and tightened by a plurality of tightening means 148 to secure the reverse mirror 140 firmly in the stretched position as shown in FIG. 3D. Other shapes than circular such as for example a rectangular reverse mirror can be employed. Furthermore a standard size and shape of mirror can be formed which subsequently is repeated to cover, very much like tiles, larger areas of mirror surfaces on a special support frame maintaining a good mirror flatness.

FIG. 4 illustrates an isometric view of the photovoltaic system 100 according to a preferred embodiment of the present invention. The plurality of ground mirrors 106 directs the solar radiation falling on them to one of the plurality of reverse mirrors 140 which reflects the radiation to the corresponding photovoltaic cell 104 in the core area 108. The plurality of ground mirrors 106 is a two direction tracking mirror to properly guide the solar radiation falling on them towards the elevated reverse mirror 140 for the different positions of the sun. Each of the plurality of land areas 110 has a respective reverse mirror 140 positioned at one of the plurality of reflection centers $A_1$, $A_2$, $A_3$, $A_4$ and $A_5$. The plurality of side adjacent areas 112 has the plurality of reverse mirrors 140 positioned on the reflection centers $A_1$, $A_3$ and $A_5$ along the respective side of the core area 108 and the plurality of diagonally adjacent areas 114 has reverse mirrors 140 on the reflection centers $A_2$ and $A_4$ along the respective diagonal of the core area 108 as shown in FIG. 4. The plurality of reverse mirrors 140 at the reflection center $A_2$ and $A_4$ are placed higher than the reverse mirrors 140 at $A_1$, $A_3$ and $A_5$. Each of the plurality of reverse mirrors 140 provides additional solar radiation to the core area 108 by reflecting the solar radiation falling on its respective land area 110. For example, as illustrated by the arrangement in FIG. 4, the incident solar radiation on the plurality of photovoltaic cells 104 is multiplied by a factor of about 6. Each of the five land areas 110 with the plurality of ground mirrors 106 reflects the solar radiation to the core area 108. The solar radiation falling directly on the core area 108 is converted in part, depending on the efficiency of the solar cells, to electricity while that falling on each of the plurality of land areas 110 is directed by the plurality of ground mirrors 106 to each of the plurality of reverse mirrors 140, which may include cooling provisions, from where it is reflected and sent to the core area 108. Thus the solar radiation falling on the plurality of photovoltaic cells 104 of the core area 108 is multiplied by about a factor of 6. In this way the solar radiation falling on the plurality of photovoltaic cells 104 of the core area 108 is multiplied by a number of times commensurate to the plurality of land areas 110 and the core area 108 with a corresponding multiple increase in the electricity produced. The exemplary arrangement as illustrated in FIG. 4 can be repeated many times to achieve the overall size and the amount of electrical energy of the power plant envisioned with appreciable concentration of solar radiation. The increase of the incident radiation on the plurality of photovoltaic cells 104 by additional solar radiation require proportionally much more cooling. The cooling of the plurality of photovoltaic cells 104 is provided by water cooling, air or passive cooling with appropriate configuration of water canals and/or fins, or the plurality of photovoltaic cells 104 are placed on a substrate with water or passive cooling provisions. The plurality of photovoltaic cells 104 makes good thermal contact with the substrate but such that different thermal expansions of different components due to temperature and material differences do not create unduly high stresses on the plurality of photovoltaic cells 104. The water cooling also provides a much better control of the operating temperature which improves the photovoltaic cell 104 operating efficiency. Such a system, or variations of it, can be taken as a modular system by the repetition of which large photovoltaic electricity producing power plants with considerable concentration factors can be formed.

Figure 5A:
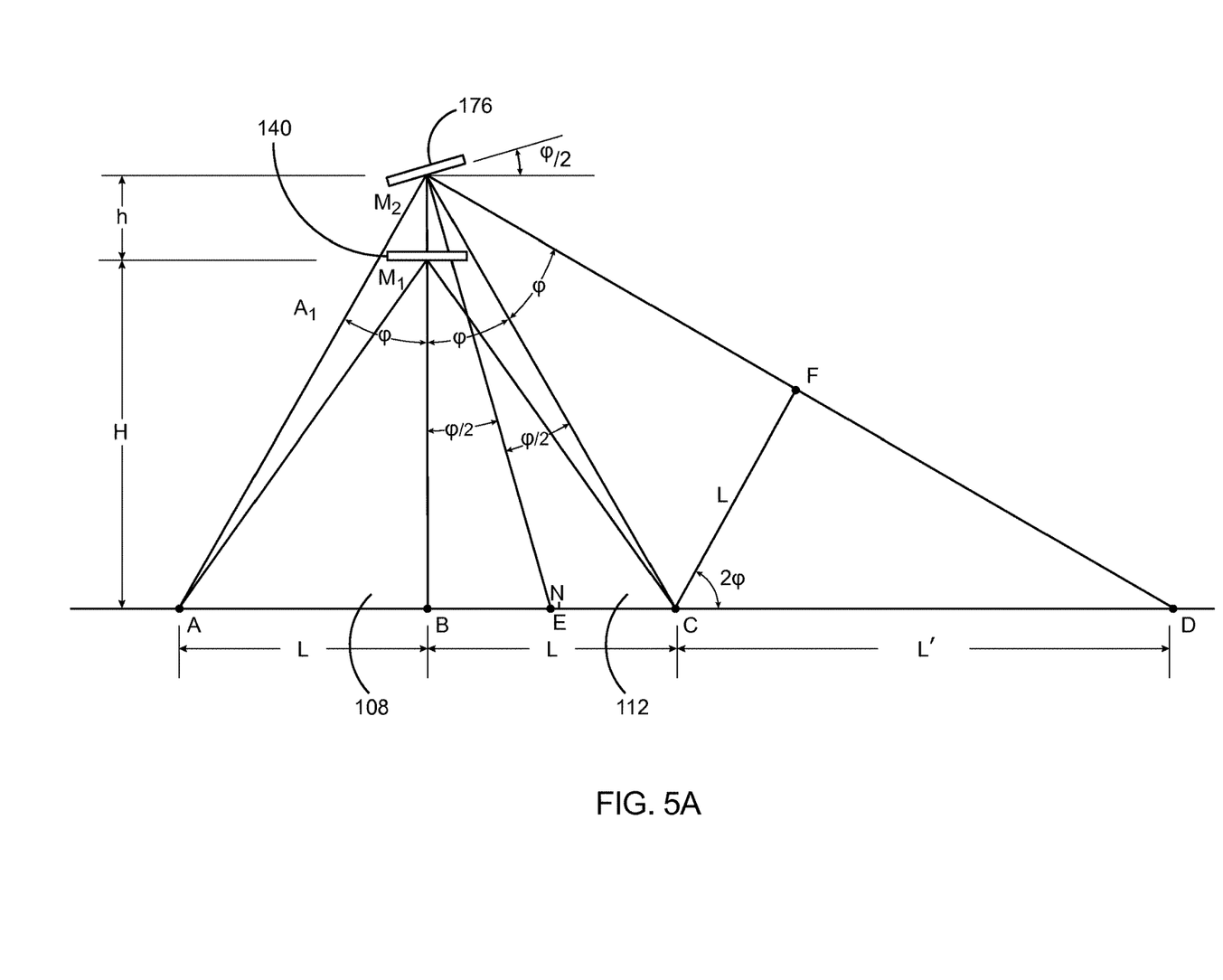
FIGS. 5A-5B illustrates a schematic view of the photovoltaic system utilizing a second reverse mirror to extend the serviced land area of reflecting ground mirrors to more distant areas according to one embodiment of the present invention.
Figure 5B:
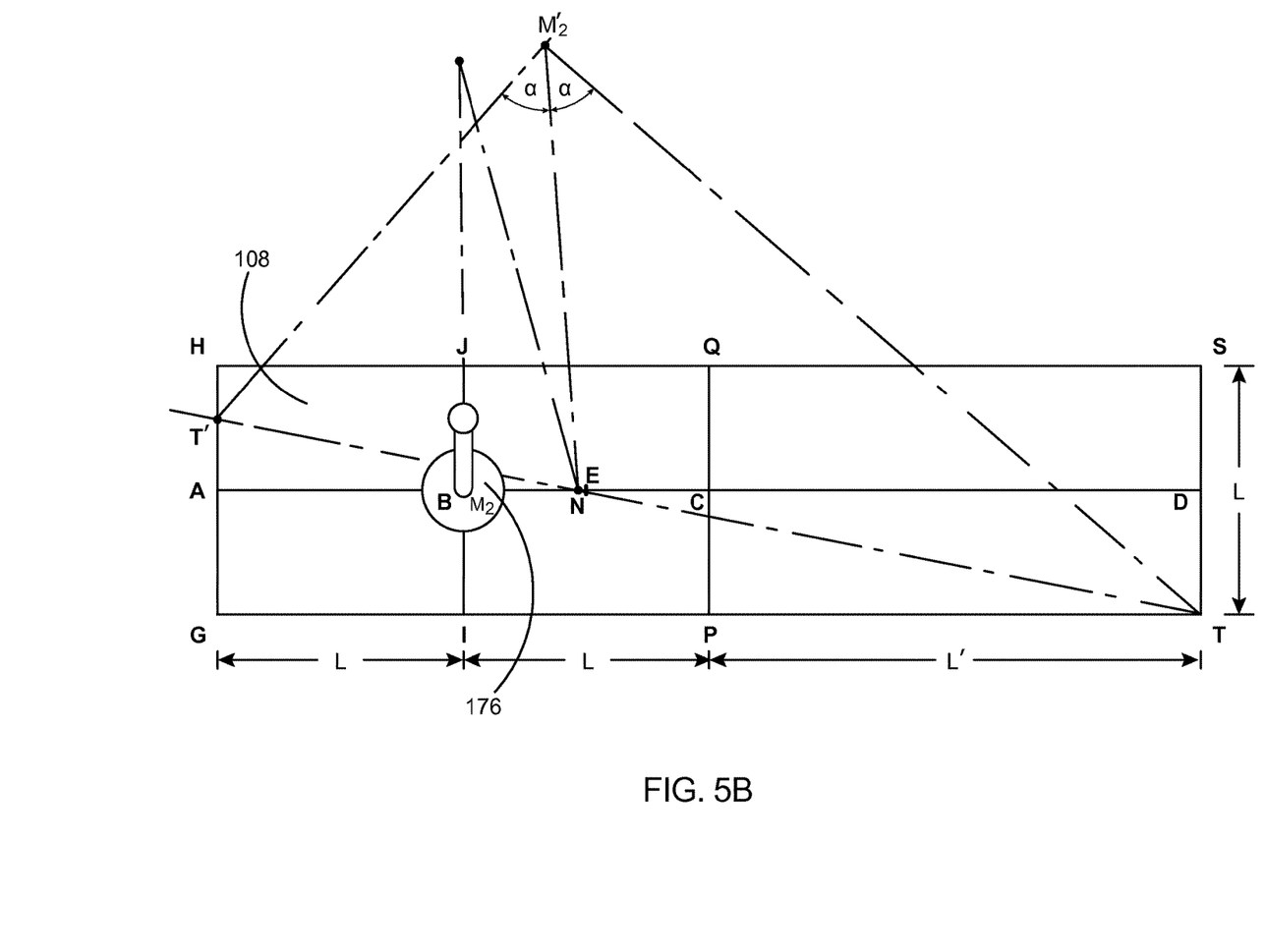

FIGS. 5A-5B illustrates a schematic view of the photovoltaic system 100 utilizing a second reverse mirror 176, which may also entail cooling provisions, according to one embodiment of the present invention. Variations in the arrangement of the plurality of land areas 110 are possible where the core area 108 is surrounded by a number of adjacent land areas 110 each point of which can be considered to be reflected to a point on the core area 108 in relation to appropriate reflection centers. Much higher concentrations than by a factor of six, can be achieved by bringing the sunlight falling on more remote areas into the core area 108 using the second reverse mirror 176. The possibility of achieving higher concentrations of solar energy in the core area 108 is illustrated by the embodiment in FIG. 5A where the core area 108 extending over a length AB=L, along the central line, is shown with the first reverse mirror 140 in its periphery held at a height H by the cylindrical pole 118 at B. The side adjacent land area 112 extending over a length BC=L is reflected to the core area 108, symmetrically, by the reverse mirror 140. However the more remote area, PQST in FIG. 5B, with central line CD can be also reflected into the same core area 108 by using a second reverse mirror 176 on the same pole 118 but at a higher height H+h and with an inclination to the horizontal equal to $\varphi/2$, as shown in FIG. 5A. In that case, point C is reflected to point B of the core area 108 while point D to point A. The line $M_2E$ bisects both the angles $BM_2C$ and $AM_2D$. The length CD is, however, not equal to L but to a length L'=L/cos 2$\varphi$ because line $M_2C$ bisects the angle $BM_2D$ forming two angles each equal to $\varphi$. Because L' is not equal to L the area CD is not reflected symmetrically to the core area 108. The core area 108 parts closer to A receive more reflected radiation from the remote area CD than parts of equal surface closer to B. In fact for $\varphi=45°$, L' tends to infinity so an infinite area is reflected to the core area 108. Accordingly very high non uniformities can arise in the concentrated radiation reflected to the core area 108 depending on the location of the reversed mirror 176 and the area from where the radiation is reflected. This is illustrated in FIG. 5B. To achieve symmetry for the remote area such as CD it requires a horizontal reversed mirror held on another pole located at a new symmetry point which is point N in the middle of BC. In that case CD=AB=L. The present embodiment thus produces an increased amount of electrical energy by utilizing the plurality of ground mirrors 106 that are comparatively cheap as compared to the plurality of photovoltaic cells 104.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A photovoltaic system for generating electrical energy, comprising:
   a plurality of photovoltaic panels, each having a plurality of photovoltaic cells positioned in a core area, the plurality of photovoltaic panels convert solar energy to electric energy;
   a plurality of ground mirrors positioned in a plurality of land areas, the plurality of land areas being adjacent to the core area, the plurality of land areas includes a plurality of side adjacent areas and a plurality of diagonally adjacent areas, the plurality of land areas each includes a reflection center; and
   a plurality of reverse mirror systems, with one of the plurality of reverse mirror systems held at each reflection center for increasing the amount of solar energy falling on the core area, each of the plurality of reverse mirror systems, comprising:
      a cylindrical pole having a top end and a hinged base;
      a plurality of supports including a hollow horizontal support having a proximal end and an open distal end and a vertical support having a first end and a second end, the proximal end of the hollow horizontal support attached to the top end of the cylindrical pole by a hinge, and a first portion of the first end of the vertical support being inserted into the open distal end of the hollow horizontal support, wherein the longitudinal axis of the first portion of the vertical support is parallel to the longitudinal axis of the hollow horizontal support;
      a reverse mirror placed in a mirror support frame and connected to the second end of the vertical support, the mirror support frame includes a plurality of rim supports, and
      a plurality of middle supports to hold the reverse mirror in place; and a plurality of adjustable supports for adjusting and positioning the reverse mirror, the plurality of adjustable supports includes a first adjustable support connected between the mirror support frame and the open distal end of the hollow horizontal support, and a second adjustable support hingedly connected between the cylindrical pole and the open distal end of the hollow horizontal support, each of the plurality of adjustable supports includes a threaded cylindrical rod;
   whereby the plurality of ground mirrors and the plurality of reverse mirror systems are positioned to increase the concentration of solar energy falling on the plurality of photovoltaic panels and thereby increase the amount of electric energy produced.

2. The photovoltaic system of claim 1 wherein the core area and the plurality of adjacent land areas is of a square or a rectangular shape.

3. The photovoltaic system, of claim 1 wherein the plurality of ground mirrors and the plurality of reverse mirror systems are arranged in such a way that the sunlight falling on the plurality of ground mirrors is directed to the reverse mirrors and reflected to fall on the plurality of photovoltaic cells so as to increase the production of electricity.

4. The photovoltaic system of claim 1 wherein the plurality of ground mirrors is placed at different heights to receive maximum radiation at different angles of the sun.

5. The photovoltaic system of claim 1 wherein the cylindrical pole extends above the side dimension of the core area such that the solar radiation is reflected downward to the plurality of photovoltaic cells.

6. The photovoltaic system of claim 1 wherein the reverse mirror system includes the reverse mirror and further includes a second reverse mirror placed on the cylindrical pole, the second reverse mirror at a height above the reverse mirror and the second reverse mirror inclined at an angle with respect to the horizontal.

7. The photovoltaic system of claim 6 wherein the second reverse mirror reflects the solar radiation falling on more remote areas compared to the core area thereby increasing the concentration of solar radiation in the core area.

8. The photovoltaic system of claim 1 wherein each reverse mirror comprises a reflecting area of circular shape.

9. The photovoltaic system of claim 1 wherein the reverse mirror has cooling provisions such as water, air or passive cooling or a combination of these.

10. The photovoltaic system of claim 1 wherein the plurality of adjustable supports allows the upward and downward movement of the hollow horizontal support through a pulley on the top end of the cylindrical pole as well as the rotational movement of the vertical support.

11. The photovoltaic system of claim 1 wherein the threaded cylindrical rod of each of the plurality of adjustable supports is held in position by a threaded upper nut and a threaded lower nut, and the threading and unthreading of the upper nut and lower nut is achieved by a motor.

12. An photovoltaic system for generating electrical energy, comprising:
   a plurality of photovoltaic panels, each having a plurality of photovoltaic cells positioned on a core area;
   a plurality of ground mirrors positioned on a plurality of land areas adjacent to the core area, the plurality of land areas includes a plurality of side adjacent areas and a plurality of diagonally adjacent areas, said plurality of side adjacent areas and said plurality of diagonally adjacent areas each including a reflection center; and
   a plurality of reverse mirror systems, with one of the plurality of reverse mirror systems held at each reflection center, each of the plurality of reverse mirror systems comprising:
      a cylindrical pole having a top end and a hinged base, the cylindrical pole being positioned at the reflection center;
      a plurality of supports that including a hollow horizontal support with a proximal end and an open distal end and a vertical support with a first end and a second end, the proximal end of the hollow horizontal support attached near the top end of the cylindrical pole by a hinge, and a first portion of the first end of the vertical support being inserted into the open distal end of the hollow horizontal support, wherein the longitudinal axis of the first portion of the vertical support is parallel to the longitudinal axis of the hollow horizontal support;

a reverse mirror positioned in a mirror support frame and connected to the second end of the vertical support, the mirror support frame includes a plurality of rim supports, and a plurality of middle supports to hold the reverse mirror in place; and a plurality of adjustable supports for adjusting and positioning the reverse mirror, the plurality of adjustable supports includes a first adjustable support connected between the mirror support frame and the open distal end of the hollow horizontal support, and a second adjustable support hingedly connected between the cylindrical pole and the open distal end of the hollow horizontal support, each of the plurality of adjustable supports includes a cylindrical rod;

whereby the plurality of ground mirrors and the plurality of reverse mirror systems are positioned in such a way as to increase the concentration of solar energy falling on the plurality of photovoltaic panels and thereby increasing the amount of electric energy produced.

13. The photovoltaic system of claim 12 wherein the plurality of ground mirrors and the plurality of reverse mirror systems are arranged in such a way that the sunlight falling on the plurality of ground mirrors is directed to the reverse mirrors, and then to the plurality of photovoltaic cells so as to increase the production of electricity.

14. The photovoltaic system of claim 12 wherein the reverse mirror system includes the reverse mirror and further includes a second reverse mirror placed on the cylindrical pole, the second reverse mirror at a height above the reverse mirror and the second reverse mirror inclined at an angle with respect to the horizontal; wherein the second reverse mirror reflects the solar radiation falling on more remote areas compared to the core area thereby increasing the concentration of solar radiation in the core area.

15. The photovoltaic system of claim 12 wherein each reverse mirror comprises a reflecting area of circular shape.

16. The photovoltaic system of claim 12 wherein the reverse mirror has cooling provisions such as water, air or passive cooling or a combination of these.

17. The photovoltaic system of claim 12 wherein the plurality of adjustable supports allows the upward and downward movement of the hollow horizontal support through a pulley on the top end of the cylindrical pole as well as the rotational movement of the vertical support to adjust the reverse mirror, along two axes.

18. The photovoltaic system of claim 12 wherein the cylindrical rod of each of the plurality of adjustable supports is threaded, and the cylindrical rod of each of the plurality of adjustable supports is held in position by a threaded upper nut and a threaded lower nut, and the threading and unthreading of the upper nut and lower nut is achieved by a motor.

* * * * *